Jan. 27, 1970     L. A. BEVACQUA     3,492,639

INTEGRATED EMERGENCY AND TURN INDICATOR LIGHTING SYSTEM

Filed Jan. 19, 1967

Inventor
LOUIS A. BEVACQUA

By *Mueller, Aichele & Rauner*

ATTYS ed States Patent Office 3,492,639
Patented Jan. 27, 1970

3,492,639
INTEGRATED EMERGENCY AND TURN INDICATOR LIGHTING SYSTEM
Louis A. Bevacqua, Des Plaines, Ill., assignor to Motorola, Inc., Franklin Park, Ill., a corporation of Illinois
Filed Jan. 19, 1967, Ser. No. 610,360
Int. Cl. B60q 1/00, 1/44, 1/46
U.S. Cl. 340—67                            2 Claims

ABSTRACT OF THE DISCLOSURE

The integrated emergency and turn indicator lighting system for an automobile includes a switch controlled by the emergency brake or the automatic transmission selector for interconnecting the left- and right-turn indicating lamp circuits. During the time the emergency brake is "on," or the automatic transmission is in "park," actuation of the turn signal lever will cause all four turn indicator lamps to flash in unison for emergency lighting. The system can also operate the front indicating lamps to warn oncoming traffic whenever the foot brake is being applied.

BACKGROUND OF THE INVENTION

With the ever-increasing automobile traffic on the streets, roads and highways there are more and more automobile failures. It is quite important that a disabled automobile include provisions for indicating to the drivers of other vehicles that an emergency breakdown condition exists in order to avoid possible collisions. Systems presently in existence utilize a separate emergency switch which can be mounted under the dash panel, on the steering column or even inside the glove compartment. When this switch is manually closed all four turn indicator lamps, mounted at the four corners of the automobile, will flash in unison and give other drivers warning of the automobile's emergency condition.

One disadvantage with this system is that an automobile parked on an incline and left in neutral or in some driving gear may move into the path of another automobile and cause an accident. This is quite possible since many drivers become panicked by a car breakdown or some other emergency and do not apply the emergency brake or, if the automobile has an automatic transmission, put the selector lever in the park position as long as they can get the emergency lighting system operational. Another disadvantage of present emergency lighting systems is that if the switch is not manually opened after the emergency condition has been corrected, or if the switch is accidentally closed, the turn indicator lighting system is disabled. In such case, regardless of the position of the turn indicator lever, all four turn indicator lamps will continue flashing in unison until the switch is opened or the battery runs down.

Another problem which arises in moving traffic situations is that when the brakes of a moving motor vehicle are being applied, there is no provision under the prevailing practice for that motor vehicle to warn the oncoming traffic of the application of the brakes. It is extremely difficult for the oncoming traffic to observe deceleration of the motor vehicle since it involves a change in the rate of closure. This problem is particularly fraught with danger at intersections where left turns can be made.

SUMMARY OF THE INVENTION

It is, therefore, an object of this invention to provide a simple integrated emergency and turn indicator lighting system for a motor vehicle whereby both operations can be initiated by the use of the turn indicator lever.

Another object of this invention is to provide a warning system for a motor vehicle whereby the vehicle must have its emergency brake on or the automatic transmission selector set in the park position before the emergency lighting system can be operated.

A still further object of this invention is to provide a warning system for a moving motor vehicle which gives an automatic warning to oncoming vehicles, as well as to vehicles to the rear, when the brakes of the moving vehicle are being applied.

In one embodiment of the invention the emergency lighting system is integrated with the turn indicator lighting system of an automobile by the addition of a switch which is wired between the left turn indicating lamps and the right turn indicating lamps of the automobile. The switch is controlled by a device which prevents movement of the automobile, such as the emergency brake or the park provisions of an automatic transmission, the switch being closed when the emergency brake is operated or the auotmatic transmission is in "park." When the turn indicator lever is subsequently moved in either direction, all four turn indicator lamps will flash in unison for emergency lighting. The switch is open when the emergency brake is released or the selector switch of the automatic transmission is moved to any other position, and the turn indicator lighting system will then operate normally. In normal movement, the automobile will now give an automatic warning of foot brake application to both oncoming and rear vehicles.

DETAILED DESCRIPTION

Figure 1:
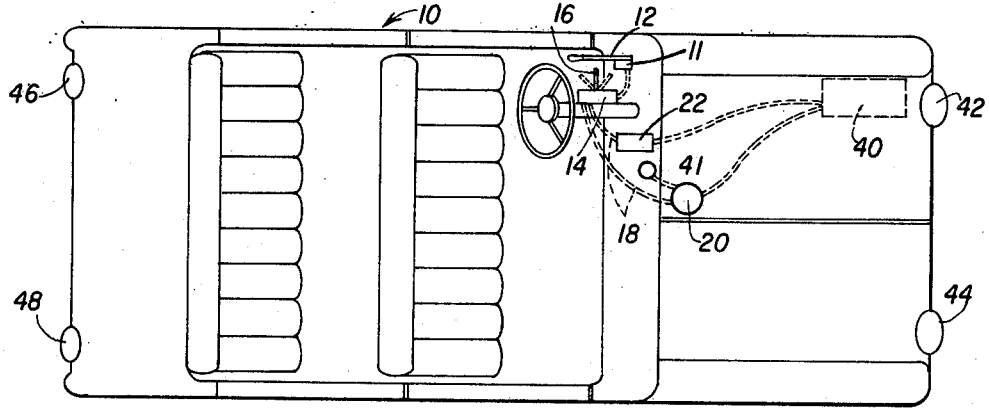
FIG. 1 illustrates the application of the emergency and turn indicator lighting system of the invention in an automobile.

Referring now to the drawing, in FIG. 1 the essential elements of an automobile 10 are shown which are utilized while practicing the invention. A switch 11 is physically connected to the emergency brake 12 so that it will be closed whenever the emergency brake 12 is operated. The switch 11 is wired into the turn indicator switch assembly 14 in order to integrate the emergency and turn indicator lighting system so that both systems can be operated by the use of the turn indicator lever 16. Cabling 18 interconnects flasher unit 20 (mounted behind the dash panel), a switch (50 in FIG. 2) connected to foot brake 22, and switch 11 connected to the emergency brake 12 to turn indicator switch assembly 14. Flasher unit 20 is a voltage interruptor device for changing the voltage from battery 40, which forms the direct current source for the system, to an intermittent DC indicator voltage.

A further description of the integrated emergency and turn indicator lighting system will be given by reference to the circuit diagram of FIG. 2. Indicator selector switch assembly 14 includes four sets of contacts, each having a movable contact and three fixed contacts. The positions of movable contacts 24, 28, 32 and 36 are controlled by the position of turn indicator lever 16 (FIG. 1). Movable contacts 24 and 28 are connected together and connected through flasher unit 20 to DC source 40. Pilot light 41 is connected between a third terminal of flasher unit 20 and a reference potential and is activated by current flow through the flasher unit to visually inform the driver. Left hand front parking and turn indicator lamp 42 is connected to fixed contact 25 and right hand front parking and turn indicator lamp 44 is connected to fixed contact 27 to be selectively engaged by movable contact 24. Left hand rear stop and turn indicator lamp 46 is connected to fixed contacts 29, 38 and 39 and right hand rear stop and turn indicator lamp 48 is connected to fixed contacts 31, 33 and 34. The other sides of lamps 42, 44, 46 and 48 are connected to the reference potential. Foot brake 22 is physically connected to brake switch 50 and controls the opening and closing thereof. Switch 50 has a movable contact 51 and a fixed contact 53. Movable contact 51 is connected to movable contacts 32 and 36 of switch assembly 14. Fixed contact 53 is connected to DC source 40.

The invention integrates an emergency lighting system into the existing turn indicator lighting system by the use of single-pole, single-throw switch 11 which interconnects contacts 29 and 31. It will be noted that movable contacts 24 and 28 are connected together and fixed contacts 25 and 29 and fixed contacts 27 and 31 are connected together. Accordingly, one set of contacts (for example, contacts 24, 25, 26 and 27) could be eliminated, but are shown as provided in standard switches. As mentioned previously the operation of switch 11, that is the opening and closing thereof, is controlled by the operation of emergency brake 12 (FIG. 1). However, it should be noted that the operation of switch 11 could be physically controlled by the operation of an automatic transmission selector to the park position, or even to the neutral position.

Figure 2:
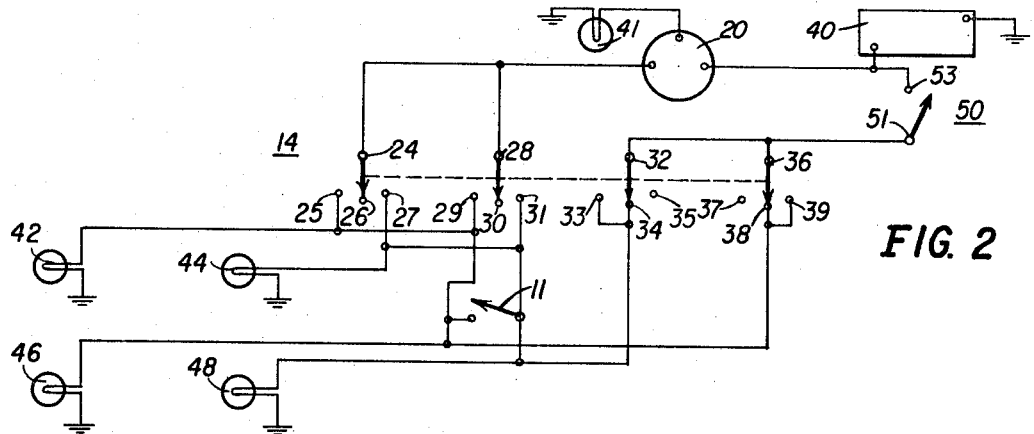
FIG. 2 is a schematic diagram of the emergency and turn indicator lighting system of this invention.

The operation of the integrated emergency and turn indicator lighting system of FIG. 2 is as follows. In normal operation when the car is moving the emergency brake 12 will be off or non-operative, and therefore switch 11 will be open. When neither a left nor a right turn is desired, the turn indicator lever 16 (FIG. 1) is in the center position. In this center position movable contacts 24 and 28 of turn indicator selector switch assembly 14 are making contact with the unconnected fixed contacts 26 and 30 respectively, and movable contacts 32 and 36 are making contact with fixed contacts 34 and 38 respectively. None of lamps 42, 44, 46 and 48 will therefore be lit since no voltage is coupled to any of them at this time. If at this time the foot brake 22 is depressed, switch 50 will close and a DC voltage from DC source 40 will be coupled through contacts 53, 51, 32, and 34 to light right hand stop lamp 48. The DC voltage from DC source 40 will also be coupled through contacts 53, 51, 36 and 38 to light left hand stop lamp 46. When the foot is removed from foot brake 22, movable contact 51 of switch 50 will open and lamps 46 and 48 will be extinguished. If a left turn is desired, turn indicator lever 16 (FIG. 1) will be manually placed in the left turn position thereby moving movable contacts 24, 28, 32 and 36 so that they make contact with fixed contacts 25, 29, 33 and 37, respectively. A periodically interrupted DC voltage will be coupled from flasher unit 20, through movable contact 24 to fixed contact 25 and intermittently light lamp 42. The periodically interrupted DC voltage will also be coupled from flasher unit 20 through movable contact 28 to fixed contact 29 and intermittently light lamp 46. Therefore, lamps 42 and 46 will intermittently flash in unison for left turn operation. No voltage is supplied to movable contacts 32 and 36 because switch 50 is open. If the turn indicator lever 16 (FIG. 1) is manually placed in the right turn position, movable contacts 24, 28, 32 and 36 of turn indicator switch assembly 14 will make contact with contacts 27, 31, 35 and 39 respectively. At this time the periodically interrupted DC voltage from flasher unit 20 will be coupled through movable contact 24 to fixed contact 27 to intermittently light lamp 44. At the same time, the periodically interrupted DC voltage will be coupled through movable contact 28 to fixed contact 31 to intermittently light lamp 48. At this time lamps 44 and 48 will intermittently flash in unison to indicate a right turn. No voltage is supplied to movable contacts 32 and 36 because switch 50 is open.

If an emergency condition necessitates the stopping of the motor vehicle, the emergency lighting system can be readily activated by placing the emergency brake 12 (FIG. 1) in the ON or operating position which will close switch 11 thereby connecting left lamps 42 and 46 to right lamps 44 and 48. At this point all of the lamps are connected together in parallel. Therefore, if turn indicator lever 16 is placed in either the left turn or the right turn position, movable contacts 24 and 28 will supply the periodically interrupted voltage from flasher unit 20 to lamps 42, 44, 46 and 48 and cause all of them to intermittently flash in unison, thereby indicating an emergency situation. The emergency lighting system can be cancelled by returning turn indicator lever 16 to its center position thereby moving movable contacts 24, 28, 32 and 36 so that they make contact with contacts 26, 30, 34 and 38, respectively. Another way of automatically canceling the emergency lighting operation is by placing the motor vehicle in a drive condition by releasing the emergency brake 12. This will cause switch 11 to open, thereby restoring normal turn indicator signaling operation to the motor vehicle. It should be obvious at this point that the invention will force the automobile driver to put the car in a position of operational safety, where it cannot be moved, when emergency lighting operation is desired. This should serve to minimize one of the motoring hazards, namely, an unoccupied car moving into the flow of traffic and causing an automobile accident.

An additional safety feature of the invention is that a warning is given to oncoming traffic whenever foot brake 22 is depressed to close switch 50. For example, with the turn indicator lever 16 in the center position, the closing of switch 50 by the application of foot brake 22 will light parking lamps 42 and 44 as well as stop lamps 46 and 48. This is due to the fact that left parking lamp 42 and left stop lamp 46 are connected in parallel, right parking lamp 44 and right stop lamp 48 are connected in parallel, and the application of the DC voltage from DC source 40 to stop lamps 46 and 48, as previously discussed, will also apply the DC voltage to parking lamps 42 and 44. The sudden lighting of the parking lamps 42 and 44 will give warning to the oncoming traffic that the driver has applied his brakes. At the present time there is no indication given to a motorist as to when a driver of an oncoming vehicle has applied his brakes, other than observing the deceleration of the vehicle, which is not readily noticeable. This would give a clear warning to the oncoming traffic to drive with caution as they approach a vehicle whose parking lamps have suddenly been lighted, since observing a sudden change in light intensity is a more positive indication of braking than observing deceleration.

If the turn indicator lever 16 is in the left turn position when switch 50 is closed by the application of foot brake 22, the DC voltage from DC source 40 will be coupled through contacts 53 and 51 of switch 50 and contacts 32 and 33 of turn indicator switch assembly 14 to light parking lamp 44 and stop lamp 48. Therefore, at this time lamps 42 and 46 will intermittently flash in unison to indicate a left turn while lamps 44 and 48 will light and give warning to both oncoming and rear vehicles of the application of the brakes. When the foot brake is released, lamps 44 and 48 will be extinguished and lamps 42 and 46 will continue to flash intermittently until lever 16 is returned to the center position.

A similar warning will be given if the turn indicator lever is in the right turn position when switch 50 is closed by the application of foot brake 22. At this time the DC voltage from DC source 40 will be coupled through contacts 53 and 51 of switch 50 and contacts 36 and 39 of switch assembly 14 to light parking lamp 42 and stop lamp 46. Therefore, at this time lamps 44 and 48 will intermittently flash in unison to indicate a right turn while lamps 42 and 46 will light and give warning to both oncoming and rear vehicles that the brakes of the car are being applied.

Figure 3:
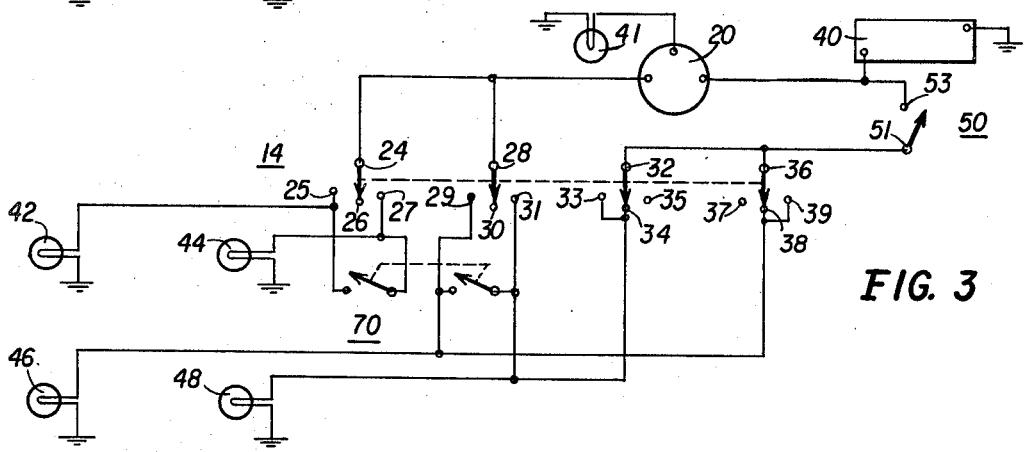
FIG. 3 is a schematic diagram of a second embodiment of the invention.

In the event that the driver does not desire this additional warning to oncoming vehicles, FIG. 3 modifies the circuit of FIG. 2 to eliminate the warning to oncoming vehicles of when the brakes are being applied. The brake lighting system, associated with the integrated emergency and turn indicator lighting system, will then operate in the conventional manner. This is accomplished by not shorting contacts 25 and 29 together and not shorting contacts 27 and 31 together. Also, in lieu of switch 11, a double-pole, single-throw switch 70 is utilized which has two sets of contacts. One set of contacts is connected across the parking lamps 42 and 44 and the other set of contacts is connected across the stop lamps 46 and 48. The circuit of FIG. 3 isolates the operation of the parking lamps from the brake lamps when foot brake 22 is depressed.

For example, if turn indicator lever 16 is in the center position when foot brake 22 is depressed, thereby closing switch 50, the DC voltage from DC source 40 will only be applied through contacts 53, 51, 32 and 34 to right hand stop lamp 48 and through contacts 53, 51, 36 and 38 to left hand stop lamp 46. Parking lamps 42 and 44 will remain unlit since they are not connected in parallel with stop lamps 46 and 48, respectively, as they are in the circuit of FIG. 2. Assume that we are in left turn operation at which time lamps 42 and 46 will intermittently flash to indicate the left turn. At this time if foot brake 22 is depressed, closing switch 50, the DC voltage will be applied from DC source 40 through contacts 53, 51, 32 and 33 to right hand stop lamp 48 only. The right hand parking lamp 44 will remain unlit since no voltage is coupled thereto at this time. The equivalent operation ensues if we are in the right turn indicator position with lamps 44 and 48 flashing intermittently and in unison. If foot brake 22 is then depressed, closing switch 50, the DC voltage from DC source 40 will be applied through contacts 53, 51, 36 and 39 to left hand stop lamp 46. The left parking lamp 42 will now remain unlit.

Applicant has disclosed a simple integrated emergency and turn indicator lighting system for a motor vehicle which automatically switches from turn indicator lighting operation to emergency lighting operation whenever the emergency brake is pulled on, and, in normal operation, provides an automatic warning to both oncoming and rear vehicles of the application of the foot brake.

I claim:

1. An integrated emergency and turn indicator lighting system for a motor vehicle including in combination, first and second lamps connected in parallel and located at the left front and left rear of the vehicle, third and fourth lamps connected in parallel and located at the right front and right rear of the vehicle, a first manually operable switch having first movable contact means and first and second fixed contact means connected to said first and second and third and fourth lamps respectively and third unconnected contact means, and second movable contact means having fourth and fifth fixed contact means connected to said first and second and third and fourth lamps respectively and sixth fixed contact means common to all said lamps, a foot brake for preventing the movement of the vehicle, a direct current source, a second switch connected between said direct current source and said second movable contact means, said second switch being operated by said foot brake to opened and closed positions, so that with said second switch being operated to said closed condition by said foot brake, and with said first manually operated switch being positioned so that said second movable contact means is connected to said sixth fixed contact means and said first movable contact means is connected to said third unconnected contact means all said lamps are energized thereby indicating operation of said foot brake, a flasher unit connected between said direct current source and said first movable contact means, a third switch connected between said left lamps and said right lamps and having an opened condition and a closed condition, and an emergency brake, said third switch being responsive to the activation of said emergency brake to change from said opened condition to said closed condition and to the release of said emergency brake to change from said closed condition to said opened condition, said first manually operable switch completing a circuit to said lamps through said flasher unit by the positioning of said first movable contact means in engagement with one of said first and second fixed contact means and by closing said third switch by operating said emergency brake thereby causing said left lamps and said right lamps to intermittently flash in unison to indicate an emergency condition.

2. The integrated emergency and turn indicator lighting system of claim 1 wherein operating said first manually operable switch to move said first movable contact means to one of said first and second fixed contact means completes the circuit from said direct current source and said flasher unit to said lamps associated with said first and second fixed contact means to which said first movable contact means is moved to flash said lamps thereby indicating a direction of turn of the vehicle, and so moving said first manually operable switch positions said second movable contact means to one of said fourth and fifth fixed contact means so that operating the foot brake causes said second switch to be operated to complete a circuit from said direct current source to the lamps associated with the selected fourth and fifth fixed contact means so that lamps not being flashed by said flasher unit during the turn are lighted to indicate operation of the foot brake.

References Cited

UNITED STATES PATENTS

| 2,667,602 | 1/1954 | Flemming | 340—55 X |
| 2,835,880 | 5/1958 | Daws | 340—81 |
| 3,263,212 | 7/1966 | Baader | 340—331 X |
| 3,300,756 | 1/1967 | Miller | 340—72 |
| 3,302,057 | 1/1967 | Siiberg | 340—81 |
| 3,320,586 | 5/1967 | Wagner | 340—80 X |
| 3,325,784 | 6/1967 | Erdelitsch et al. | 340—74 |
| 3,333,149 | 7/1967 | Siiberg | 340—80 X |
| 3,350,684 | 10/1967 | Turner | 340—71 X |

THOMAS B. HABECKER, Primary Examiner

K. N. LEIMER, Assistant Examiner

U.S. Cl. X.R.

340—69, 81